United States Patent [19]

Wiegand

[11] 4,271,762
[45] Jun. 9, 1981

[54] PLEASURE VEHICLE AND A TRANSPORTATION SYSTEM UTILIZING THE SAME

[76] Inventor: Josef Wiegand, Landstrasse 12, 6419 Rasdorf, Fed. Rep. of Germany

[21] Appl. No.: 900,891

[22] Filed: Apr. 28, 1978

[30] Foreign Application Priority Data

Aug. 16, 1977 [DE] Fed. Rep. of Germany ....... 2736731
Sep. 19, 1977 [DE] Fed. Rep. of Germany ....... 2742141

[51] Int. Cl.³ .................. A63G 21/02; B61B 9/00; B61B 12/12
[52] U.S. Cl. ..................................... 104/69; 104/118; 104/134; 104/173 R; 104/193; 188/8; 272/56.5 R; 280/12 AB
[58] Field of Search ................ 104/53, 59, 63, 64, 104/69, 118, 119, 120, 134, 173 R, 183, 193, 242; 188/5, 8, 185; 272/56.5 R, 56.5 SS; 280/11, 12 R, 12 AA, 12 AB, 18; 187/72

[56] References Cited

U.S. PATENT DOCUMENTS

| 368,157 | 8/1887 | Lubbering ........................... 104/193 |
| 384,843 | 6/1888 | Harrington ...................... 104/193 X |
| 552,692 | 1/1896 | Moore ................................ 104/119 |
| 789,750 | 5/1905 | Messler ............................. 104/242 |
| 946,200 | 1/1910 | Bragg ................................. 104/63 |
| 1,084,390 | 1/1914 | Bosworth ...................... 104/193 X |
| 3,858,517 | 1/1975 | Luck et al. ........................ 188/8 X |
| 3,973,785 | 8/1976 | Becker et al. ...................... 280/11 |

FOREIGN PATENT DOCUMENTS

2515994 10/1976 Fed. Rep. of Germany ..... 272/56.5 R
409292 4/1934 United Kingdom .................... 188/185

Primary Examiner—Randolph A. Reese
Attorney, Agent, or Firm—Ernest F. Marmorek

[57] ABSTRACT

A pleasure vehicle which is to be used on a trough-shaped downhill track, includes a vehicle body and a leg support, extending frontwardly therefrom. A plurality of support elements support the vehicle on the downhill track for movement down the track. A plurality of brake shoes are mounted on the vehicle body, for simultaneous displacement by a single actuating lever into and out of braking positions, so that the support elements of the vehicle body are lifted off the downhill track, while the support elements of the leg support continue to guide the vehicle on the downhill track.

6 Claims, 20 Drawing Figures

PLEASURE VEHICLE AND A TRANSPORTATION SYSTEM UTILIZING THE SAME

SUMMARY OF THE INVENTION

The present invention relates to a pleasure vehicle in general, and more particularly to a vehicle which is intended to be used on a downhill track, particularly on a trough-shaped track. Furthermore, the present invention is related to a transportation arrangement which transports the vehicle to an uphill station.

Pleasure vehicles of the above-mentioned type are already known in a variety of constructions. Usually, these vehicles are used on downhill tracks, which are built on slopes of ski resorts or the like, in order to make these centers, whose capacities have been previously fully utilized only during the wintertime, attractive even when the skiing season is over. It will be appreciated that, unless the capacity of a ski resort can be fully utilized all year-round, the investment which goes into establishing the ski resort does not bring the necessary return to make it attractive to investors. On the other hand, there may also be available scenic paths in an area which is not being used for skiing during the wintertime, but which, for other reasons, attracts vacationers. Even under these circumstances, it may be advantageous to erect a downhill track of the type here under consideration, and to offer the public the possibility of riding thereon.

The downhill tracks which are suitable for the above purposes, usually have substantial lengths, such as, for instance, 1,000 meters, or even more. Under these circumstances, it is imperative that a sliding or a rolling vehicle be offered to the prospective users of the downhill track. In order to make travel on the downhill track more enjoyable, or to assure the safety of the user of the pleasure vehicle, it is necessary that the vehicle be capable of being accelerated and decelerated, in a simple manner, and in rapid succession. Once the user of the vehicle has reached the downhill end of the downhill track, the vehicle must be transported to the uphill station again, and so must the same, or a different user of the vehicle. Also, the downhill transportation must be conducted in such a way so as to be safe and comfortable.

As for the conventional vehicles, there has been proposed, following an original use of simple textile or synthetic plastic material mats, a sliding vehicle which consists of a rigid shell of synthetic plastic material which accommodates a sitting passenger, together with the stretched feet of the passenger. The sliding vehicle is supported on the downhill track by means of sliding blades of synthetic plastic material, and can be accelerated when a rubber roller is pressed downwardly against the downhill track. Experience with this type of vehicle has shown that, because of its excessive length, this vehicle is rather difficult to handle, incapable of negotiating the curves of the downhill track properly, and has a tendency to excessively swing in the transverse direction of the downhill track. This vehicle may become very dangerous to the passenger when being used on the downhill slide, if it is not equipped with any special protection at the rear end thereof, in that the user of the vehicle may become injured, when a following vehicle collides with the vehicle which the passenger occupies.

To alleviate the above-mentioned problems of this type of sliding vehicle, there has also been proposed a very similar sliding vehicle which is being operated in the same manner. However, instead of using the above-mentioned shell, which is rigid even in the region thereof which accommodates the stretched legs of the passengers, this vehicle only has a shell-shaped seat, and utilizes a felt mat, which extends frontwardly from the seat, and is equipped with a foot rest. However, it has been established that the user of this vehicle quite often may lose hold of the mat, so that the latter then will be found to slip in an uncontrolled manner towards the front of the seat. Aside from this inconvenience, this vehicle also has a tendency to strongly oscillate in the transverse direction of the downhill track.

Of course, there are also known a variety of sleds, bobsleds, slides, and similar sporting or recreational vehicles, either for winter or summer use. However, since these vehicles are usually not confined during their downhill movements on tracks of the type here under consideration, they are so much different from the pleasure vehicle in question as not to require any extensive discussion here.

Suffice it to say that except for bobsleds which are being used on snow or ice, none of these vehicles are confined to travel in a track. Because of the different functions of these vehicles, the design considerations concerning the same are also completely different.

Inasmuch as the downhill track is located in the open on a hillside or the like, it can happen quite frequently that it may become wet while being used, as a result of rain, drizzle, fog, or dew, in many instances, even completely unexpectedly. However, it is crucial for the safety of the passenger to be able to brake or retard the vehicle, even when the downhill track is wet, inasmuch as the passengers would otherwise be in danger of being injured, and under the worst conditions, even be mortally wounded. It has also been experienced that the passenger has lost control of the vehicle, for one reason or another, and has been incapable of actuating the brake lever. Under these circumstances, it would be advantageous, and it may be even mandatory, to so construct the vehicle and the braking arrangement thereof, so that the vehicle is stopped or prevented from commencing a downhill motion on the downhill track in the absence of releasing the braking handle.

The heretofore used and previously discussed vehicles do not satisfy the above-mentioned conditions. More particularly, the prior art vehicles, no matter with what number of brake shoes they are equipped, have brake shoes, which are rather small, so that these small brake shoes are incapable of disturbing or removing the water film from the downhill track, thus preventing the braking shoes from properly engaging the downhill track; and, under some circumstances, the brake shoes may then become totally ineffective. Also, in all of these conventional vehicles, the passenger must operate an actuating lever, when he desires that the vehicle either not commence its movement or be retarded, or stopped when already moving.

Another problem which is encountered in connection with a pleasure vehicle of this type, is the uphill transportation of the passengers and of the pleasure vehicles. It is already known to utilize chair lifts for transporting the passengers and the vehicles to the uphill station. Such chair lifts are very expensive, due to their construction, and even their operation, and involve a rather high operational cost. This is primarily attributable to the fact that operating personnel are needed to assist the passengers, while being seated on, and also while standing up from the chairs of the chair lifts, as well as for attaching the vehicle to, and detaching the same from, the chair, so as to have the vehicle travel with the passenger on the same chair lift from the downhill to the uphill station.

There are further known monorail tracks for self-propelling electric vehicles. These are also very expensive and complicated arrangements which, in addition, cannot be used during adverse weather conditions, particularly in the wintertime.

There is further known a tow which can be used outside the skiing season to transport the passengers on their own transportation vehicles, which are attached to the cable of the tow, uphill. A disadvantage of this tow resides in the fact that the user of this vehicle has only a very short period of time available for entering the transportation vehicle, which time period is determined by the time which it takes for the pulling rope to be withdrawn from an accumulator thereof. While this time period is very short as it is, the situation is further aggravated by the fact that the vehicle must also be taken care of. The necessary handling of the vehicle is very cumbersome, and in most circumstances, operating personnel must be present, at least at the downhill station, to hand the vehicle to the passenger, who has already entered the vehicle.

SUMMARY OF THE INVENTION

Accordingly, it is a general object of the present invention to avoid the disadvantages of the prior art.

More particularly, it is an object of the present invention to provide a pleasure vehicle which is not possessed of the above-mentioned disadvantages.

It is a further object of the present invention to provide a vehicle of the type here under consideration which is easy to handle, has an excellent behavior, especially in curves, excellently keeps its course on the downhill track, and whose speed on the downhill track can be controlled by the user in dependence on the slope of the track, and as desired by the user.

Yet another object of the present invention is to so construct the pleasure vehicle as to be able to predetermine the proper or final speed of the vehicle, and to be able to brake the vehicle even in the absence of any action on the part of the user.

An additional object of the present invention is to so design the pleasure vehicle as to be able to brake the same, even on a wet downhill track.

It is yet another object of the present invention to provide a vehicle which is retarded or stopped in the absence of any operation of an actuating lever.

A further object of the present invention is to provide a pleasure vehicle and an uphill transportation arrangement therefor which are simple in construction, inexpensive to manufacture and to operate, and nevertheless, very reliable.

In pursuance of these object and others, which will become apparent hereafter, one of the features of the present invention resides, briefly stated, in a pleasure vehicle for use on a downhill track, which comprises a vehicle body, a leg support pivotally mounted on the vehicle body, and means for so supporting the vehicle on the track for downward movement thereon, so that the leg support extends frontwardly of the vehicle body, the supporting means including respective support elements on the vehicle body and on the leg support. In a vehicle of this type, the present invention further provides a plurality of brake shoes, each mounted on the vehicle body for displacement between an extended and a retracted position, and means for simultaneously displacing the brake shoes at least into the extended positions thereof, for the brake shoes to contact the track, and to so support the vehicle body thereon, so that all of the support elements of the vehicle body are out of contact with the track, while the support elements of the leg support continue to support the leg support on the track, and thus guide the vehicle on the track. In view of the fact that the support elements include both sliding blades and rollers, the vehicle is excellently guided on the downhill track. As a result of this expedient, the vehicle has an excellent capability of negotiating the curves and of keeping its course on the downhill track.

The vehicle is provided with an actuating lever which is pivotally mounted on the front portion of the vehicle body. Now, when the user of the vehicle pivots the actuating lever, which can be easily clamped between the knees of the user, rearwardly, the braking shoes are being pressed against the track, so that the rollers and sliding blades of the vehicle body are lifted off the track. In this manner, there is obtained a very strong braking action. On the other hand, when the actuating lever is pushed forwardly, until it abuts an abutment of the vehicle, the actuating lever, together with the forward part of the vehicle body located frontwardly of the axis of the rollers, acts as a tilting lever, with the aid of which a part of the weight of the user is transferred from the forwardly arranged sliding blades to the frontwardly arranged rollers of the vehicle body. In view of the fact that the rollers have a considerably lower coefficient of friction than the sliding blades, the speed of the vehicle on the downhill track will accordingly increase. When the actuating lever is pushed forward to the extreme, the rear sliding blades of the vehicle body are completely lifted from the downhill track, and the entire weight of the user is now supported only on the rollers. Thus, when the vehicle is constructed in this manner, it can be accelerated and decelerated quite strongly while the vehicle moves only a short stretch of the track. A vehicle for one, two, or more passengers, can be built in accordance with this principle.

In accordance with a further feature of the present invention, the vehicle can be accommodated to the respective track by shifting the frontwardly arranged rollers and/or the rearwardly arranged sliding blades frontwardly or rearwardly. By shifting the rollers and/or the sliding blades, it is possible to control the distribution of the weight between the rollers and the sliding blades in such a manner as to influence the basic speed of the vehicle on the track, that is, the speed at which the vehicle would move down the track in the absence of any operation of the actuating lever. So, for instance, when the frontwardly arranged rollers are displaced frontwardly, they become more remote from the point at which the weight of the user acts on the vehicle body, so that a lesser portion of this weight is being supported on the rollers, while a proportionately greater portion of the weight of the user is being supported on the rearwardly arranged sliding blades. In this manner, the basic speed of the vehicle is being reduced, so that the vehicle is suitable for use on relatively steep downhill tracks. Conversely, but in a similar manner, the rearward shifting of the frontwardly arranged rollers will make the vehicle suitable for use on downhill tracks of relatively lesser steepness. However, the basic speed of the vehicle can also be influenced by utilizing sliding blades which have different coefficients of friction on the downhill track.

When the front rollers or the rear sliding blades are displaced rearwardly to the desired extent, the basic speed of the vehicle may reach such a velocity, that there is no need for accelerating the vehicle by pivoting the actuating lever forwardly. Under these circumstances, the actuating lever acts only as a brake lever. Then, the user of the vehicle controls the speed of travel of the vehicle on the downhill track only by controlling the braking action of the brake shoes.

In accordance with a currently preferred facet of the invention, the vehicle body is provided with a seat which is recommended to be made of, for instance, polyurethane foam and which includes an impact-absorbing backrest and a front bulge. Such a seat gives the user a conveniently soft accommodation accompanied by a very good retention of the user in the seat, where the backrest, in addition to increasing the comfort of the passenger, also protects the back of the passenger from injury, in the event that a user of a vehicle following the user of the vehicle under consideration, or "present" vehicle, catches up and collides with the present vehicle. The fact of the presence of the frontward bulge renders it possible to predetermine the sitting position of the user when the vehicle travels at the basic speed on the downhill track. Of course, neither the backrest, nor the frontward bulge prevent the user of the vehicle from transferring his center of gravity frontwardly and rearwardly of the vehicle.

A further feature of the present invention resides in the fact that the vehicle is capable of being decelerated even in the absence of any cooperation on the part of the passenger. To achieve this, the vehicle is so constructed that the brake shoes, which are arranged closer to the central or longitudinal plane of the vehicle than the support elements, extend spatially beyond the support elements of the vehicle body in all positions of the brake shoes, so that the latter are capable of contacting a raised region of the track, even when retracted during the operation of the vehicle.

Thus, under normal circumstances, the radius of the trough-shaped track is such that a sufficient spacing is present between the brake shoes and the track, when the brake shoes are in their retracted positions. When the above-mentioned raised region of the track is provided, for instance, by increasing the radius of the trough-shaped downhill track, the above-mentioned spacing is eliminated, and the brake shoes, even when retracted, will contact the track, and thus brake the vehicle thereon. Such a flattened region of the track can be provided, for instance, at the downhill end of the track; however, short sections of this flattened configuration also can be provided elsewhere along the track, at those locations where it is desired to reduce the speed of the vehicle. On the other hand, it is is also possible to control the speed of the descent of any particular vehicle on the track by providing the track with portions which can be raised into contact with the brake shoes of the particular vehicle, when the latter reaches the location where such raisable portions are situated. Also, it is possible to so construct the downhill track that at least some segments thereof can be varied in radius to thereby further make it possible to retard the vehicle on the track.

In accordance with a further currently preferred aspect of the present invention, the speed of travel of the vehicle down the track can be limited by providing the rollers with at least one centrifugally operated brake. While it is advantageous when both of the frontwardly located rollers of the vehicle body are provided with, or acted upon, by centrifugally operated brakes, it is also quite sufficient when the centrifugally operated brake acts only on one of the frontwardly located rollers. Under these circumstances, when a predetermined level of speed is reached by the vehicle, the centrifugally operated brake will subject the vehicle to a unilateral action, so that the passenger loses the feeling of safety, which makes the passenger reduce the speed of the vehicle on the downhill track to a reasonable level, by actuating the braking lever. Other speed-dependent braking systems could also be used instead of the centrifugally operated brake. A further influence on the passenger, which may make him or her change the speed of the vehicle in the desired manner, can be obtained by issuing optical or acoustical signals.

In accordance with a further concept of the present invention, the brake shoes are being urged by a spring or the like towards the extended or braking position, so that the actuating lever will have a tendency, together with the associated brake shoes and connecting linkage, to assume the respective braking positions, unless actuated. Thus, the vehicle will be braked unless the activating lever is displaced frontwardly by the passenger.

To be able to brake or retard the vehicle even on a wet track, each of the brake shoes is elongated in the direction of movement of the vehicle track, and has such a length that the front region thereof substantially removes moisture from the wet track, so that the rear region of the same brake shoe is capable of effectively braking the vehicle on the demoisturized zone of the track. Advantageously, at least the front region of the brake shoe has a draining profile to push the water sidewardly of the brake shoe.

A further aspect of the present invention resides in the fact that the vehicle can be used without requiring the actuation of the actuating lever when it is desired to brake the vehicle, and that the weight of the seat and of the passenger sitting thereon is being utilized for achieving the braking action. To achieve this, the vehicle is provided with a means for transmitting at least a part of the weight of the seat and/or of the passenger to the brake shoes, to urge the latter towards the extended positions thereof. Thus, in the absence of any actuation of the braking lever, the brake for the unoccupied seat, and the weight of the passenger sitting thereon, will urge the brake shoes into a braking contact with the downhill track.

Only when the actuating lever is pushed forwardly, is the seat lifted together with the brake shoes which are operatively connected thereto, so that the above-mentioned support elements become active for supporting the vehicle on the downhill track for movement thereon. However, as soon as the forward push of the actuating lever is discontinued, the brake shoes will again become active. In order to avoid the possibility that the brakes could become active in a very sudden manner, the vehicle may be so constructed that, for instance, the rear ends of the brake shoes will contact the downhill track first. A further damping of the braking action can be achieved by arranging a resiliently yieldable member in the braking mechanism.

After reaching the downhill end of the downhill track, the vehicle, and also the same or a different passenger, have to be brought back to the uphill end of the downhill track for renewed use of the vehicle. Advantageously, in accordance with a further concept of the present invention, this is achieved in such manner that there is provided a tow for towing the vehicle uphill, and an uphill track which is arranged underneath the tow and which is tailored to the configuration of the vehicle. The tow is capable of pulling the vehicle, even when occupied, upwardly on the uphill track, and advantageously in such a manner that the passenger faces downhill, while the vehicle is being towed in the rearward direction thereof.

According to a currently preferred aspect of the present invention, the uphill track has a guiding web which extends longitudinally thereof, and the vehicle has a pair of guiding rails which accept the guiding web therebetween to prevent derailment of the vehicle from the uphill track. The upper surface of the guiding track is either planar, or of a dove-tailed configuration. In addition to guiding the vehicle on the uphill track, the guiding web also serves for engagement therewith of an automatic safety brake mounted on the vehicle. The brake includes a brake body which is pivotally suspended from the vehicle at the lower side thereof. The brake body, which may be made predominantly of rubber, slides on the guiding web, so long as the vehicle is being pulled upwardly on the uphill track. However, should the vehicle commence movement in the opposite direction on the uphill track, then the brake body will engage the guiding web, and the vehicle will rest on the brake body as the latter is pivoted into its active position. Thus, the safety brake will stop the vehicle after only a very short distance has been covered by the vehicle on the uphill track in the downhill direction. Thus, the vehicle is prevented from uncontrollably moving down the uphill track, particularly if becoming detached, for one reason or the other, from the tow. The contact surface of the brake body may be corrugated or roughened to thereby increase its braking action on the guiding web.

In accordance with a further aspect of the present invention, the uphill track is so designed, particularly by forming two longitudinally extending channels arranged laterally of the guiding web, that the passenger cannot retard or brake the vehicle on the uphill track, by actuating the braking lever of the vehicle.

The uphill track may consist of a plurality of sections or segments, which are supported on respective supports at the regions of contact with one another in an aligned relationship with respect to one another. Advantageously, the support is exactly coordinated with the shape of the uphill track, and is connected to the end portion of one of the two consecutive segments of the track, particularly by welding. However a part of the support extends beyond the end portion of the respective segment which is connected thereto, and another end portion, preferably the lower portion of the next consecutive segment of the track, is supported thereon, so that both of the above-mentioned segments are supported by a single support. As a result of the above-discussed configuration of the segments of the track and of the supports therefor, the two adjoining end portions form a smooth transition, while not being capable of shifting relative to one another either in the vertical or the lateral directions. On the other hand, there are provided expansion gaps at the respective supports, so that the temperature-linked expansion of the segments can be compensated for at the respective supports. Advantageously, the support is supported, in turn, on a tie which is buried in the ground. In this manner, the uphill track is anchored to the respective slope. When the ground is difficult to handle, or when the slope is very steep, other and additional anchoring elements, such as nails, can be used instead of, or in addition to the above-discussed tied.

A further aspect of the present invention has to do with the attachment of the vehicle to the tow at the downhill station and the automatic detachment of the vehicle therefrom at the uphill station of the uphill track. The tow is preferably of the type which includes a cable on which there is carried an accumulator for a rope which can be pulled out of the accumulator. More particularly, the tow of the present invention includes a gripping rod associated with each of the accumulators, and a connecting hook is connected to the respective gripping rod at the free end thereof, the hook having a free end portion which is curved opposite to the curvature of the remainder of the hook. With the aid of this free end portion of the opposite curvature, it is possible to push the hook into a position in which the hook will automatically disengage from a connecting eyelet which accommodates the same. Also, the other end of the hook is similarly curved, but beyond the pulling axis. As a result of this curvature of the other end, in the event of any diminution of the pulling force, the hook will be rotated, due to its own weight, into the eyelet rather than being accidentally rotated out of engagement with the eyelet.

The connecting eyelet, which is rigidly connected to the cable, has such dimensions that the hook can be rapidly and easily introduced thereinto by the operating personnel. The eyelet extends substantially along a vertical plane, as a result of which the eyelet always provides secure holding action for the hook, even when the angle of the pulling force varies. However, the eyelet must also perform the task of guiding the hook, particularly the free end of the hook, always in the same position, and possibly close to the guiding web into an automatic disengaging arrangement at the uphill station of the uphill track, independently of the angle of the pulling force and a possible twist of the pulling rope. To achieve this, the opening into the eyelet has an enlarged portion which converges in the direction of application of the pulling force, so that the hook is closely embraced by the eyelet, so long as the vehicle is being towed uphill, while being easily introducible into, and withdrawable from, the enlarged portion of the opening of the eyelet, without, however, rotating about the axis of the rope. When the eyelet closes an angle of approximately 5° with the vertical plane, the end portion of the hook will be guided in a close proximity to the guiding web.

In view of the fact that the vehicle can assume a plurality of different positions on the uphill track, for instance, as a result of the frontward pushing of the actuating lever, or even as a result of the upward component of the pulling force of the pulling rope on the vehicle, owing to which the connecting eyelet will assume an undesired position with respect to the guiding web of the uphill track, it is necessary to assure that, at least as the vehicle approaches the uphill end of the track, the vehicle and the eyelet thereof will be properly positioned with respect to the automatic disengaging arrangement. For this purpose, the vehicle body of the vehicle is so constructed, that the axles or shafts on which the rollers, the sliding blades, and the actuating lever, respectively, are mounted, have the same distance from the guiding web when the vehicle is properly supported from the uphill track. Now, when the rear axle or vehicle is lifted above the centrally located axle of the rollers, the axle of the actuating lever will come closer to the guiding web. Utilizing this situation, the track is provided with correction rails at the upper margins of the guiding web, being made of a synthetic plastic material, the height of these rails being identical with the desired distance of the above-mentioned axles to the guiding web. Now, should the vehicle reach the downhill end of the above-mentioned correction rails in any other than the properly aligned position, the axles of the vehicles, particularly the axle of the actuating lever, will ride on the rails, and thus the vehicle will be pushed into its proper position.

A further concept of the present invention concerns the disengagement of the connecting hook from the connecting eyelet. After the connecting hook, which is exactly aligned in all directions, as explained above, reaches the uphill station, it will meet an obstruction which is arranged in a channel provided in the space between the connecting eyelet and the correction rail, which in general accepts the end portion of the connecting hook. The obstruction includes a roller rotatable about the vertical axis, or an inclined cam surface. Now, the free end portion of the connecting hook meets this obstruction and is moved transversely and into the connecting eyelet. In view of the fact that the end portion of the connecting hook has the above-mentioned opposite curvature, and as a result of the inertia of the hook, the free end portion of the hook slides all the way out of the opening of the connecting eyelet, and thus releases the vehicle at the uphill station. However, the same result can also be obtained when the connecting eyelet is mounted on the gripping rod of the rope of the tow, while the connecting hook is mounted in the rear of the vehicle.

A further concept of the present invention resides in the fact that the free end portion of the connecting hook is prevented from rotating upwardly within the connecting eyelet, and thus from possibly by-passing the aforementioned obstruction. This is achieved, according to this concept of the present invention, in that the upper region of the end portion of the correction rail which is located immediately upstream of the above-mentioned obstruction, is extended in a direction towards the center of the guiding web, so that the extension of the connecting rail prevents the free end portion of the connecting hook from lifting off from the uphill track. Thus, the free end portion is reliably guided towards the above-mentioned obstruction and the trajectory of movement thereof.

Having so revealed the basic concepts of the present invention, the structural details will become apparent from the following detailed description, when read in conjunction with the accompanying drawing.

DETAILED DESCRIPTION OF THE PREFERRED EMBODIMENTS

Figure 1:
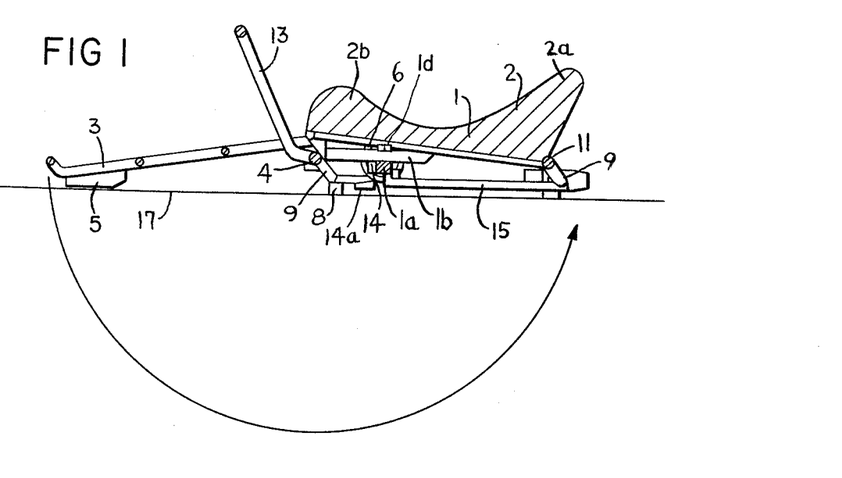
FIG. 1 is a longitudinal sectional view of a vehicle of the present invention.
Figure 2:
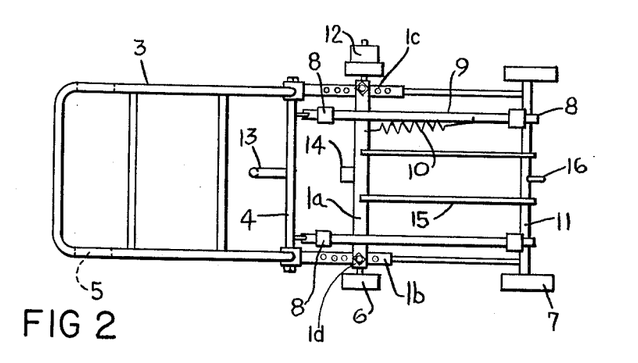
FIG. 2 is a bottom plan view of the vehicle of FIG. 1.

Referring now to the drawings, in detail, and first to FIGS. 1 and 2 thereof, it may be seen that the reference numeral 1 indicates the frame or vehicle body of a pleasure vehicle, according to the present invention. The vehicle body 1 is equipped with rollers 6 and with sliding blades 7, which together support the vehicle body 1, on a downhill track 17, for movement thereon. The vehicle body 1 supports a seat 2, in which the user of the vehicle may be seated. The legs or at least the feet of the passenger of the vehicle are supported on a leg support 3 which, as illustrated, extends forwardly of the vehicle body 1. The leg support 3 is mounted on the vehicle body 1 for pivoting relative thereto as indicated by the arrow, so that the leg support 3 can be transferred into a collapsed position thereof, in which the vehicle is ready for being transported manually from one location to another. The leg support 3 is equipped with sliding blades 5 which contact the downhill slide 17 when the vehicle is located thereon, and thus support the leg supports, and guide the front end of the vehicle on the downhill track 17.

The seat 2 has a backrest portion 2a at the rear end thereof, and a bulge 2b, at the front end thereof. An actuating lever 13 is mounted on the vehicle body 1 for pivoting about an axle 4. The actuating lever 13 is connected to a connecting linkage 9, which interconnects a plurality of brake shoes 8, which are mounted on the vehicle body 1 for pivoting between the respective retracted or inoperative, and extended or braking positions. When the user of the vehicle pivots the lever 13 in the rearward direction of the vehicle, the connecting linkage 9 will simultaneously displace all of the brake shoes 8 into their respective extended positions, until the sliding blades 7 and the rollers 6 are lifted from the downhill track 17 only by means of the brake shoes 8, whereby a pronounced braking action is obtained. The rear members of the connecting linkage 9 are mounted on an axle 11, which is rigidly supported on the vehicle body 1.

The rollers 6 are mounted on a shaft 1a, which is mounted for displacement forwardly and rearwardly of the remainder of the vehicle body 1, in a conventional, manner, such as, for example, by shifting the location of the shaft 1a with respect to the arms 1b by means of respective bolts with associated nuts 1d being passed through corresponding openings 1c in the arms 1b; alternatively, instead of using nuts and bolts, the shaft 1a could be welded to the arms 1b at a preselected position. Depending on the slope of the downhill track 17, the shaft 1a can be moved forwardly or rearwardly relative to a portion 1b of the vehicle frame 1. The shaft 1a can then be permanently secured in any selected position relative to the portion 1b, such as by welding or by screws, rivets, or the like. The vehicle is further provided with a safety brake 14, which is suspended from the shaft 1a, and is so arranged as not to contact the downhill track 17 under any circumstances. The purpose and function of this safety brake will be explained later on.

The vehicle body 1 further has, at its lower side, two confining rails 15, whose purpose will also become apparent as the present discussion proceeds. A tension spring 10 is connected to the connecting linkage 9, at its one end, and to the shaft 1a, at its other end, the spring 10, urging the linkage into that position thereof in which the brake shoes 8 assume the extended position. A centrifugally operated brake 12 is also mounted on the shaft 1a, being of a completely conventional construction, and being operative for retarding the rotation of at least one of the rollers 6, when the vehicle exceeds a predetermined speed limit on the downhill track 17.

Figure 3:
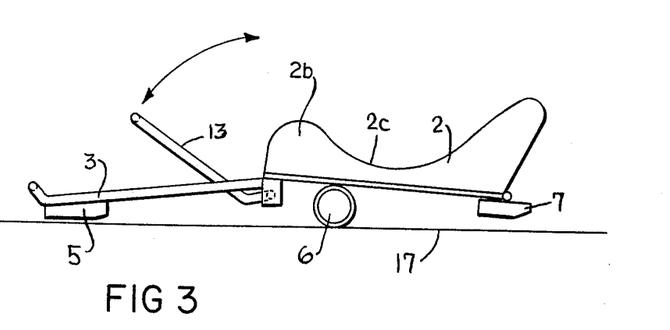
FIG. 3 is a somewhat simplified side elevational view of the vehicle of FIG. 1 in an accelerating position thereof.

Referring now to FIG. 3, it may be seen that the vehicle of the present invention is illustrated in its accelerating position, in which the actuating lever 13 is pressed all the way forward. As a result of the forward pressing of the actuating lever 13, the center of gravity of the user of the seat is transferred forwardly to above the rollers 6, so that the rearward sliding blades 7 are lifted off the downhill track 17. Under these circumstances, inasmuch as the weight of the user, which has previously been located in a depression 2c located between the bulge 2b and the backrest 2a, is transferred frontwardly toward the region of the bulge 2b, so that only the rollers 6 will support the vehicle body 1 on the downhill track 17. As a result of this, the vehicle body 1 and the weight of the user of the vehicle are supported exclusively on the rollers 6, which are in a rolling contact with the downhill track 17, whereby the fractional resistance to the downhill movement of the vehicle on the downhill track is reduced to a minimum, and thus the vehicle is accelerated on the downhill track 17.

Figure 4A:
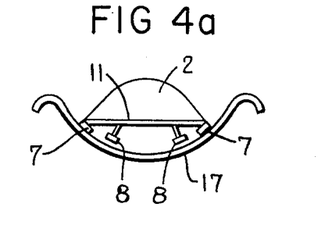
FIG. 4a is a rear end view of the vehicle of FIG. 1, as supported on a normally designed downhill track.
Figure 4B:
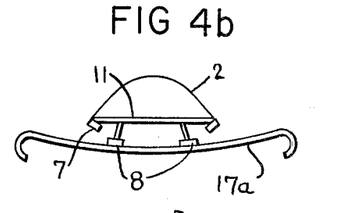
FIG. 4b is a view similar to FIG. 4a, but with the vehicle being supported on a relatively flat segment of the downhill track.

FIG. 4a illustrates the vehicle as being accommodated in the downhill track 17 of a normal configuration. The actuating lever 13 is in its accelerating position, as a result of which the brake shoes 8 are out of contact with the downhill track 17, while the sliding blades 7, and correspondingly even the rollers 6, support the vehicle body 1 on the downhill track 17. On the other hand, FIG. 4b illustrates an increased diameter section 17a of the downhill track. Under these circumstances, despite the fact that the actuating lever 13 may still be in the position for acceleration, the vehicle body 1 rests entirely on the brake shoes 8, which extend spatially beyond the support elements 7, inasmuch as the latter cannot contact the section 17a of the downhill track 17 because of the less pronounced curvature of the section 17a. In this manner, the vehicle is decelerated regardless of any action on the part of the user of the vehicle. The section 17a will usually be provided at the downhill end of the downhill track 17; however, it is also possible and advantageous to arrange other sections, similar to the section 17a, at any locations where it is desired to reduce the speed of the downhill motion of the vehicle on the downhill track, such as before sharp curves or the like. Also, some of the sections of the downhill track 17 may be so constructed that the radius of curvature thereof can be changed by the operating personnel of the downhill track 17, when it is desired, for any reason, to reduce the speed of the downhill motion of any particular vehicle on the downhill track 17. Instead of changing the diameter of the particular section 17a, it is also possible to equip the same with projections which extend into the active range of the brake shoes 8, without otherwise changing the configuration of the particular section. These projections may either be permanent, or may be extended or retracted as desired by the operating personnel.

Figures 5, 6, 7A, 7B:
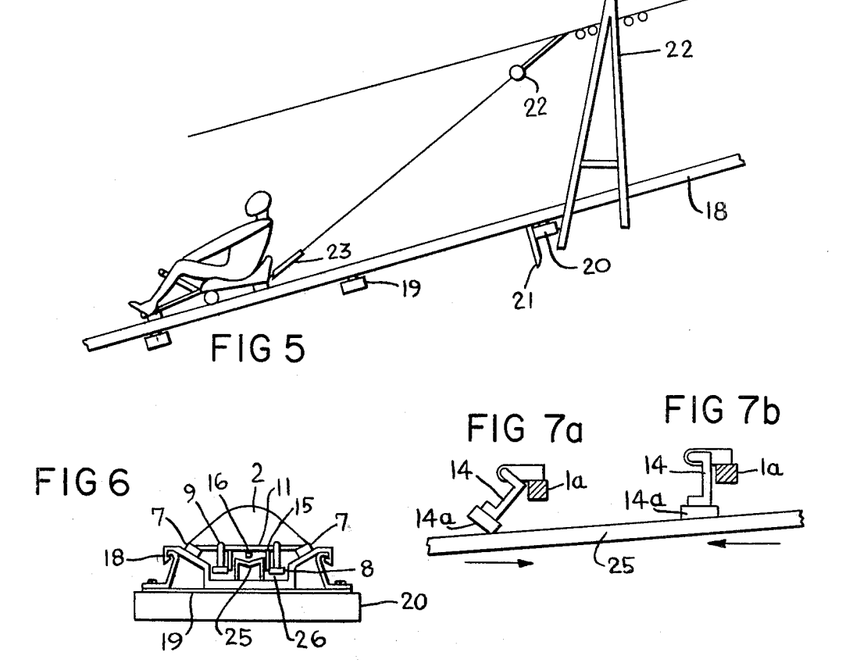
FIG. 5 is a somewhat diagrammatic side elevational view of a tow having the vehicle of FIG. 1 attached thereto.
FIG. 6 is a rear end view of the vehicle of FIG. 1 as accommodated on the uphill track of FIG. 5.
FIG. 7a is a detailed side elevational view of a safety brake in its inactive position.
FIG. 7b is a view similar to FIG. 7a, but with the safety brake in its active position.

After reaching the downhill end of the downhill track 17, the vehicle and the same, or different user thereof, are to be transported to the uphill end of the downhill track 17. A transporting arrangement suited for this purpose is illustrated in FIG. 5. As seen therein, the transportation arrangement includes a tow 22, and an uphill track 18, which is arranged underneath the tow 22. The vehicle is so oriented on the uphill track 18, that the passenger occupying the same faces downhill, while the tow 22 is connected to the rear end of the vehicle, and pulls the same rearwardly up on the uphill track 18. The uphill track 18 consists of individual segments preferably made predominantly of alloyed steel, such as stainless steel. The individual segments of the uphill track 18 are supported on supports 19 which, in turn, are connected, such as by screws, to ties 20. When desired or necessary, the ties 20 may be anchored in the ground by nails 21.

A cross section of the uphill track 18, with the vehicle being accommodated therein, is illustrated in FIG. 6. As seen herein even more clearly, the uphill track 18 rests on the respective supports 19, which are connected by a plurality of screws to the respective tie 20. In addition to its support function, the supports 19, because of their particular configuration, which is adapted to that of the uphill track 18, also serve to prevent the segments of the uphill track 18 from shifting, relative to each other, either laterally or upwardly of the uphill track 18. However, the individual segments may so adjoin each other at their respective end, which are supported on the respective support 19, as to leave a gap therebetween in which any thermally induced expansion or contraction of the individual consecutive segments of the uphill track is being compensated for.

As also illustrated in FIG. 6, the uphill track 18 is formed with a guiding web 25, which extends longitudinally of the uphill track, and has either a planar or a dovetail-shaped upper surface. The above-mentioned confining rails 15 of the vehicle body 1 of the vehicle confine the guiding web between themselves, thus guiding the vehicle on the guiding web and preventing derailment of the vehicle from the uphill track 18. When the upper surface of the guiding web 25 has the illustrated dovetail-shaped configuration, there is obtained an additional available space between the rear axle 11 of the vehicle body 1, and the central region of the guiding web 25, without diminishing the areas of the surfaces of the guiding web 25, with which the confining rails come into contact. The additional available space also brings about substantial advantages as far as the cooperation of a connecting eyelet 16, and a connecting hook 24, with a disengaging roller 29, all still to be discussed, is concerned.

Two channels 26 are formed laterally of the guiding web 25, and between the same and those support surfaces of the uphill track 18, along which the sliding blades 7 slide and the rollers 6 roll. The brake shoes 8 of the vehicle body are accommodated in these channels 26, while the vehicle is being towed uphill on the uphill track 18 by the tow 22. The channels 26 have such depth that the brake shoes 8 cannot ever contact the uphill track 18, no matter which position the actuating lever 13 happens to assume.

FIGS. 7a and 7b, illustrate the aforementioned safety brake 14 in the inoperative and in the operative positions thereof, respectively. The safety brake 14 has a brake body 14a, preferably of rubber or the like, and is suspended for pivoting on the shaft 1a of the vehicle body 1. The safety brake 14 is so constructed and the pivoting point thereof is so arranged in a close vicinity of the leg support 3, that the adjustment axis of the safety brake 14 extends substantially normal to the guide web 25 of the uphill track 18, which serves as the cooperating surface for the brake body 14a. Due to the normal position of the adjustment axis, the safety brake 14 will therefore securely engage, even when the vehicle is on a steep uphill track 18.

The operation of this safety brake 14 is evident from the position shown in FIGS. 7a and 7b. However, it is to be mentioned by way of an explanation that, as soon as the vehicle, for any reason whatsoever, commences to move downward on the uphill track 18, the brake body 14a, which was previously in sliding contact with the guiding web 25, will now frictionally engage the web 25, as a result of which the safety brake 14 will be transferred from the position of FIG. 7a into that of FIG. 7b, and the brake body 14a will frictionally retard the downhill movement of the vehicle on the uphill track 18, up to a full stop.

Figure 8:
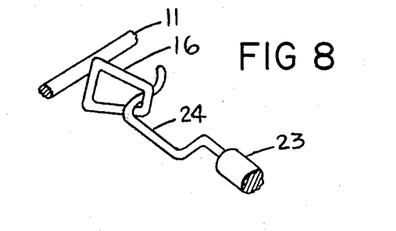
FIG. 8 is a perspective view illustrating a connecting eyelet and a connecting hook engaged therein.

FIG. 8 illustrates, in a perspective view, the arrangement of the above-mentioned connecting eyelet 16, on the axle 11 of the vehicle body 1, and a portion of a gripping rod 23, of the tow 22, which is provided at a free end thereof with a connecting hook 24. The connecting eyelet 16 is so constructed that, in order to facilitate the introduction of the connecting hook 24 of the tow 22, it has an enlarged portion, while it converges in the direction of the pulling force. Thus, while an end portion of the hook 24 can be easily introduced into the enlarged portion of the opening of the eyelet 16, the free end portion of the hook 24 will be safely lodged in the narrow portion of the opening of the eyelet 16, once the tow 22 commences to pull the vehicle up the uphill track 18. As also illustrated in FIG. 8, the connecting hook 24 is so constructed as to have such different curvatures that the hook 24 is held in the opening of the eyelet 16 with a sufficient force, as long as the vehicle is being pulled upwardly by the tow 22, on the one hand, but so that the hook 24 can also be easily removed from the eyelet 16, when subjected to an external lateral force, even when the hook 24 is still under the influence of the pulling force of the tow 22, on the other hand.

The hook 24 has an extended free end portion, which is curved opposite to the remainder of the hook 24. The curvature of the hook 24 is so selected at that end thereof which is connected to the gripping rod 23, that the free end of the hook 24 is still rotated within the opening of the connecting eyelet 16, under the influence of the weight of the gripping rod 23, in the event that the pulling force of the tow 22 is reduced, or discontinued for any reason. It will be appreciated that, should a hook 24 not provide a configuration as shown in the drawings at the end thereof connected to the gripping rod 23, and if it is then attempted to introduce it into the eyelet 16, the free end portion of the hook 24 would then turn in the opposite direction in the eyelet 16, and the hook would become unintentionally disengaged therefrom.

Figure 9:
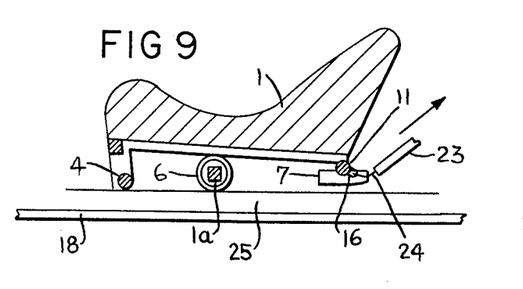
FIG. 9 is a longitudinal section of the vehicle of FIG. 1, in an improperly tilted position thereof.

FIG. 9 illustrates the pleasure vehicle of the present invention as accommodated in the uphill track 18. As a result of the fact that the tow 22, and consequently, the gripping rod 23, pull the vehicle at an acute angle to the uphill track 18, the rear transverse axle 11, which supports the sliding blades 7, is slightly rotated about the shaft 1a, which carries the rollers 6. As a result of this tilting, the eyelet 16 is removed from the original immediate proximity to the guide web 25 of the uphill track 18, so that, were this situation permitted to exist at the uphill station of the uphill track 18, the above-mentioned disengaging roller 29 would be incapable of pushing the connecting hook 24 out of the eyelet 16. Thus, the disengaging roller would become inoperative for its intended purpose.

Figure 10:
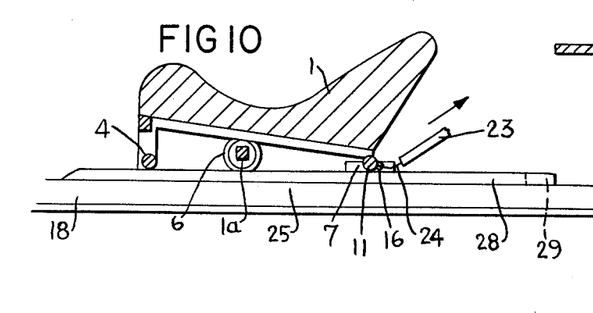
FIG. 10 is a view similar to FIG. 9, with the vehicle in its correct position.

To remedy this situation, at least the uphill end portion of the uphill track 18 is constructed as illustrated in FIG. 10. It may be seen that the guiding web 25 is provided with correction rails 27 and 28, also illustrated in FIG. 12, which engage the tilting axle 4 of the actuating lever 13, from below, thus causing the pivot axle 4, and thus the entire vehicle 1, to rotate about the shaft 1a, as illustrated, in a clockwise direction, as a result of which the eyelet 16 and the hook 24 engaging therein, will be brought into close proximity of the guiding web 25. In this manner, the connecting hook 24 travels in a trajectory into which the disengaging roller 29, or a similar guiding surface, extends, so that the disengaging roller 29 will be operative for disengaging the hook 24 from the eyelet 16.

Figure 11:
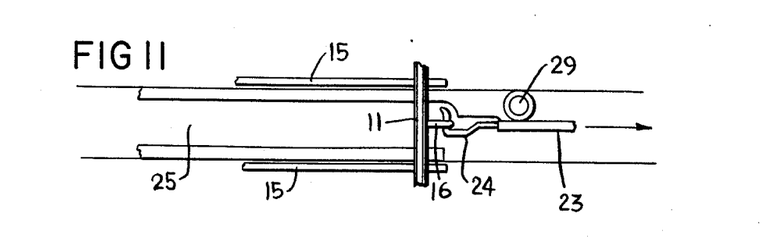
FIG. 11 is a top elevational view of a detail of FIG. 5, illustrating the automatic disengaging mechanism for the connecting hook.

FIG. 11 illustrates a top plan view of a detail of the vehicle and of the guiding web 25 of the uphill track 18, which is equipped with the above-mentioned correction rails 27 and 28. The free end portion of the hook 24, the trajectory of movement of which is exactly predetermined by the confining rails 15 and by the correction rails 27 and 28, is in contact, as the vehicle is further displaced in the rightward direction as illustrated in this figure, with the disengaging roller 29.

As the movement of the vehicle continues, the disengaging roller 29 will act on the free end portion of the hook 24, so as to push the same laterally through the eyelet 16, until the eyelet 16 is juxtaposed with the oppositely curved free end portion of the hook 24, from whereon inertia, and the opposite curvature, will make the hook 24 continue its movement through the eyelet 16, until the hook 24 becomes completely disengaged therefrom. In order to prevent the rear portion of the hook 24 from rotating upwardly, and thus from bypassing the disengaging roller 29, the upper portion of the correction rail 28 has an extension projecting towards the center of the guiding web 25, the extension confining the free end portion of the hook 24 between itself and the upper surface of the guiding web 25, and thus reliably guiding the free end portion of the hook 24 towards the disengaging roller 29.

Figure 12:
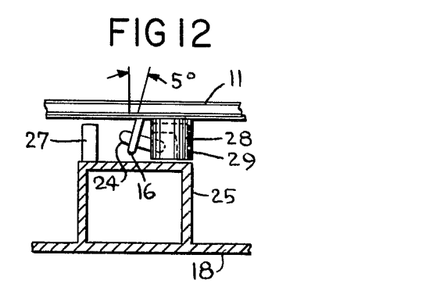
FIG. 12 is a view illustrating the disengaging mechanism in a direction opposite to the movement of the vehicle on the uphill track.

FIG. 12 illustrates a detail of the disengaging arrangement. As seen in this figure, the rear transverse axle 11, together with the eyelet 16 and the hook 24, are located immediately upstream of the disengaging roller 29. The correction rail 28, with the inward extension thereof, is illustrated in broken lines. As also seen in this figure, the eyelet 16 may subtend a small angle, such as 5°, with the vertical direction, so that the hook 24, and particularly, its free end portion, will also be tilted to the same extent with respect to the horizontal, the free end portion of the hook 24 thus moving in a trajectory which is proximate to the upper surface of the guiding web 25.

Figure 13:
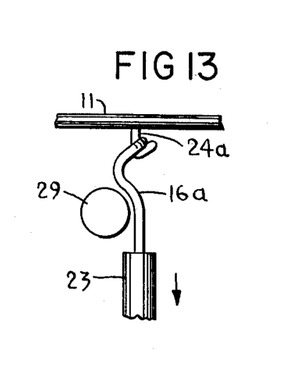
FIG. 13 is a view similar to FIG. 11, but with the connecting hook and connecting eyelet arranged in reverse.
Figure 14:
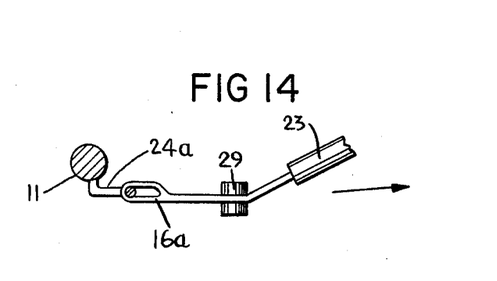
FIG. 14 is a side elevational view of the arrangement of FIG. 13.

FIGS. 13 and 14 illustrate a modified embodiment of the connecting means of the present invention, which operates in accordance with the same principle as discussed above. However, in this modification, the connecting eyelet 16a is mounted on the gripping rod 23, and the connecting hook 24a is mounted on the rear axle 11 of the vehicle body 1 of the vehicle. As illustrated, the hook 24a and the eyelet 16a are so constructed as to function in the same manner as the above-discussed hook 24 and eyelet 16.

Figure 15:
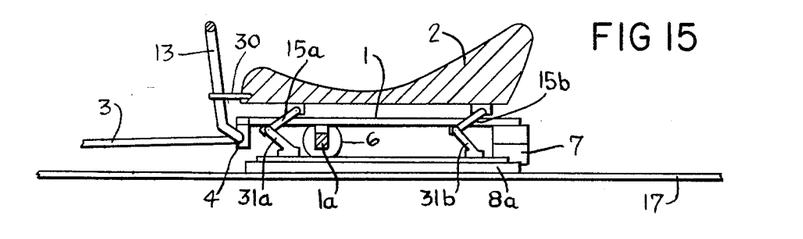
FIG. 15 is a view similar to FIG. 1, but of a modified embodiment of the vehicle of the present invention.

As may be seen in FIG. 15, the weight of the passenger and that of the seat 2 is transmitted, preferably by two pivotally mounted angular lever pairs 15a and 15b, to the brake shoes 8a, which are illustrated as extending longitudinally of the vehicle under most of the vehicle body 1. In this particular construction, the forward and rearward movement of the actuating lever 13 is directly transmitted to the seat 2 via a connecting link 30.

Figure 16:
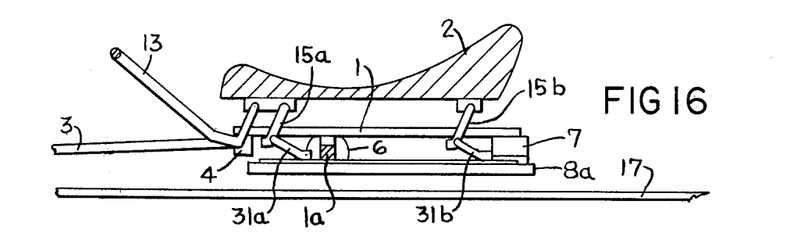
FIG. 16 is a view similar to FIG. 15, but including some further modifications of the vehicle.

The actuating lever 13 illustrated in FIG. 16 of the drawing is constructed as an angled lever having a longer actuating portion, and at least one, but preferably two shorter portions, which extend substantially at right angles, with respect to the actuating portion, and are connected to the seat 2. Thus, the pivoting of the actuating portion of the actuating lever 13 is directly transmitted to the seat 2 and, via the same, to the lever pairs 15a and 15b. Thus, when the actuating lever 13 is pivoted forwardly, the seat 2 and the throughgoing brake shoes are being simultaneously lifted with respect to the downhill track 17. As a result of this, the weight of the seat 2 and of the passenger occupying the same will rest on the rollers 6 and on the sliding blades 7, as long as the actuating lever is maintained in the forwardly pivoted position thereof.

Figure 17:
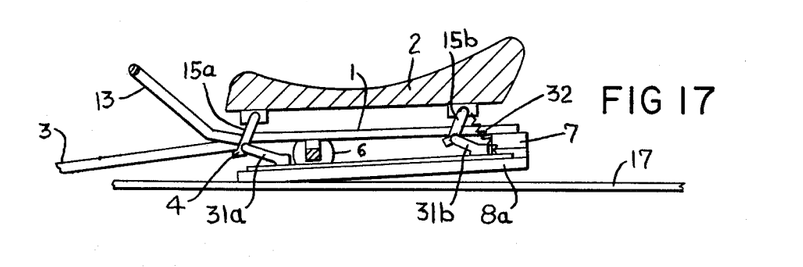
FIG. 17 is a view again similar to FIG. 15, but revealing some additional modifications of the vehicle.

The vehicle is illustrated in FIG. 17 in its accelerating position, in which the rearwardly located sliding blades 7 are lifted from the downhill track 17, as the result of the extreme forward pressing of the actuating lever 13, the forwardly located, angularly constructed actuating lever 13 is so positioned on the front portion of the vehicle body 1, that the axle 4 thereof coincides with the axle of the forward lever 15a. A gradual engagement of the brake shoes 8a can be obtained as a result of the provision of a compressing spring 32, that cooperates with an abutment.

Figure 18:
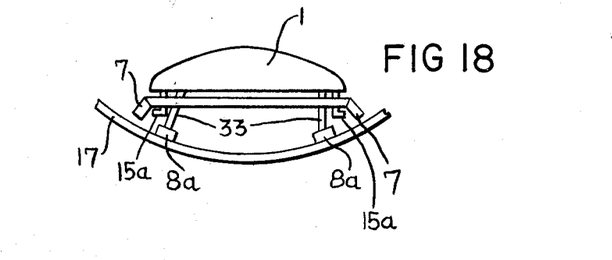
FIG. 18 is a rear end view of the vehicle similar to, but modified with respect to the embodiment of FIG. 15.

A rear view of the vehicle as accommodated in the downhill track 17 is illustrated in FIG. 18. In this modified embodiment, the brake shoes 8a are rigidly connected to the seat 2 by upright supports 33, of which the left one is illustrated as extending substantially normally to the inner surface of the trough-shaped downhill track 17, and the right one has been shown as being substantially vertical.

While the lifting and lowering of the seat 2 and of the brake shoes 8a have been illustrated and described as being accomplished by means of the angular levers 15a and 15b, it is to be understood that other conventional arrangements, such as articulated levers, interengaging gears, rack-and-pinion transmissions, wedge arrangements, or rolls cooperating with inclined planes could be used instead.

The concepts and structural embodiments of the present invention are so fully revealed in the foregoing discussion that the elements thereof can be used by others in similar constructions without departing from the spirit of the present invention and that alternative structures can be employed in the environment of the present invention without materially affecting the same.

Although the invention has been illustrated and discussed as being embodied in a pleasure vehicle to be used on trough-shaped downhill and uphill tracks, it will be understood that the present invention is not limited to the details shown, but rather that obvious variations and modifications of structure and use within the current knowledge are contemplated to fall within the scope of protection afforded by the following claims:

I claim:

1. A pleasure vehicle for use on a downhill track, comprising in combination:
    a vehicle body,
    a leg support pivotally mounted on said vehicle body, and extending frontwardly from said vehicle body,
    support means for supporting the vehicle on the track for downward movement thereon, including respective support elements on said vehicle body and on said leg support,
    a plurality of brake shoes operative for braking said vehicle body, each mounted on said vehicle body for displacement between an extended and a retracted position,
    displacement means for simultaneously displacing said brake shoes to contact the track, and so support said vehicle body thereon so that all of said support elements of said vehicle body are out of contact with the track, while said support elements of said leg support continue to support said leg support on the track and thus guide the vehicle thereon, said displacement means including means for urging said brake shoes toward said extended positions,
    an actuating lever pivotally mounted on said vehicle body and operative for displacing said brake shoes from said extended position to said retracted position, so as to discontinue the braking by the brake of said shoes, and
    a seat mounted on said vehicle body, said urging means including transmitting means including a plurality of transmitting links articulated to said seat and to said brake shoes, respectively, for transmitting at least a part of the weight of said seat and any additional weight resting thereon to said brake shoes, to urge said brake shoes toward said extended position, and wherein said seat rises relative to said vehicle body as said actuating lever displaces said brake shoes towards said retracted position.

2. A pleasure vehicle for use on a downhill track, comprising in combination:
a vehicle body,
a leg support pivotally mounted on said vehicle body, and extending frontwardly from said vehicle body,
means for supporting the vehicle on the track for downward movement thereon, including respective support elements on said vehicle body and on said leg support,
a plurality of brake shoes each mounted on said vehicle body for displacement between an extended and a retracted position, said brake shoes extending spatially beyond said support elements of said vehicle body in all positions thereof to contact a raised region of the track even when in said retracted positions, and
means for simultaneously displacing said brake shoes at contact the track and so support said vehicle body thereon that all of said support elements of said vehicle body are out of contact with the track, while said support elements of said leg support continue to support said leg support on the track and thus guide the vehicle thereon.

3. A pleasure ride arrangement, comprising in combination:
at least one pleasure vehicle,
a tow for towing the vehicle uphill,
an uphill track arranged underneath said tow,
a downhill track separate from said uphill track,
means for connecting said vehicle to said tow, including a connecting eyelet and a connecting hook which is rapidly engageable in said eyelet at a downhill station and disengageable therefrom at an uphill station of the tow, and which has an end portion which extends beyond said eyelet in the engaged position of the connecting means, said vehicle being capable of assuming different positions on said uphill track while being towed on said uphill track by said tow,
means for automatically disengaging said connecting means at said uphill station only in one of said different positions of said vehicle, and
means on said uphill track at least at said uphill station for bringing said vehicle into, and maintaining said vehicle in said one position, including correction rails extending longitudinally of said uphill track and engaging said vehicle.

4. A pleasure ride arrangement, comprising in combination:
at least one pleasure vehicle,
a tow for towing the vehicle uphill,
an uphill track arranged underneath said tow,
a downhill track separate from said uphill track, including a connecting eyelet and a connecting hook which is rapidly engageable in said eyelet at a downhill station and disengageable therefrom at an uphill station of the tow, and which has an end portion which extends beyond said eyelet in the engaged position of the connecting means,
means at said uphill station for automatically disengaging said hook from said eyelet, including a disengaging element extending into the trajectory of movement of said end portion of said hook, and
a guiding rail on said uphill track defining a channel for receiving said end portion of said hook and for guiding the same toward said disengaging means.

5. A pleasure vehicle as defined in claim 4, wherein said support elements of said vehicle body include at least two sliding blades and at least two rollers, and individual carriers for said sliding blades and for said rollers, respectively, and further comprising displacement means for mounting at least one of said carriers on said vehicle body to shift it into a selected position frontwardly and rearwardly of said vehicle body, respectively, and means for securing said one carrier in the selected position.

6. A pleasure ride arrangement, comprising in combination:
at least one pleasure vehicle,
a tow for towing the vehicle uphill,
an uphill track arranged underneath said tow,
a downhill track separate from said uphill track, and
means for connecting said vehicle to said tow, including a connecting eyelet and a connecting hook, said connecting hook having a substantially U-shaped end portion, the free end of the U-shaped end portion being substantially S-shaped and having a curvature substantially in a sense opposite to that of said U-shaped end portion, said hook being rapidly engageable in said eyelet at a downhill station and disengageable therefrom at an uphill station of the tow, said S-shaped free end extending beyond said eyelet in the engaged position of the connecting means.

* * * * *